United States Patent

[11] 3,607,735

| | | |
|---|---|---|
| [72] | Inventors | Howard K. Hover<br>Somerville;<br>Derk Th. A. Huibers, Berkeley Heights;<br>Lawrence J. Serkanic, Jr., North Plainfield,<br>all of N.J. |
| [21] | Appl. No. | 838,547 |
| [22] | Filed | July 2, 1969 |
| [45] | Patented | Sept. 21, 1971 |
| [73] | Assignee | Air Reduction Company, Incorporated<br>New York, N.Y. |

[54] SYSTEM FOR TREATMENT OF SECONDARY SEWAGE
21 Claims, 6 Drawing Figs.

[52] U.S. Cl................................................ 210/7,
210/14, 210/170, 210/195, 210/220
[51] Int. Cl........................................................ C02c 1/08
[50] Field of Search............................................ 210/3–8,
14, 15, 194–197, 170, 220, 205

[56] References Cited
UNITED STATES PATENTS
| | | | | |
|---|---|---|---|---|
| 1,963,354 | 6/1934 | Currie | | 210/221 X |
| 2,676,919 | 4/1954 | Pirnie | | 210/8 |
| 3,477,947 | 11/1969 | Kappe | | 210/3 |

*Primary Examiner*—Michael Rogers
*Attorneys*—Francis B. Henry and Edmund W. Bopp ABSTRACT: Sewage effluent from a primary treatment plant is initially pumped to a vacuum deaerator for removal of dissolved air and hence nitrogen, from the effluent stream. This stream, deaerated as required, is joined with a stream of recycled activated sludge and a stream of pure oxygen in quantity sufficient to meet the "biological oxygen demand" (BOD) of the combined effluent and recycled activated sludge. The confluence is pumped through an underground pipeline reactor having a static mixer for enhancing contact between the oxygen, aerobic bacteria and organic pollutants. The reactor stream BOD is progressively reduced to the required level at the reactor outlet. A downstream clarifier separates the reactor activated sludge from treated waste water and separated sludge in part is returned for recycling to the inlet of the reactor. The clear waste effluent from the clarifier is sent to tertiary treatment units or to receiving waters.

PATENTED SEP 21 1971 3,607,735

INVENTORS
HOWARD K. HOVER
DERK TH. A. HUIBERS
LAWRENCE J. SERKANIC, JR.
BY
F. B. Henry
ATTORNEY

INVENTORS
HOWARD K. HOVER
DERK TH. A. HUIBERS
LAWRENCE J. SERKANIC, JR
BY F.B. Henry
ATTORNEY

SYSTEM FOR TREATMENT OF SECONDARY SEWAGE

BACKGROUND OF THE INVENTION

Methods used and proposed prior to this invention for the treatment of primary sewage effluents using the "activated sludge" process are essentially the same or are closely analogous to the original process developed in England by Arden and Lockett in 1914. In this process, aerobic bacteria are allowed to feed and grow on organic impurities, expressed as "biological oxygen demand" (BOD) in waste water. Generally, this step is carried out in large concrete basins or the like, equipped with agitators or other mixing devices. An oxygen supply usually in the form of air is provided for the growing bacteria. After the growth stage, the bacterial masses are finally separated from the waste stream in a settling tank or clarifier. Part of the separated bacterial mass, called "activated sludge," is cycled to the inlet of the aeration unit, the excess being waste. The separated clear effluent from the clarifier has a lower BOD than the incoming waste water, depending on the effectiveness of the oxygen in promoting bacterial action.

Following development of this basic process, significant improvements have been relatively few and far between and have resulted more from changes in sludge-waste water contacting schemes than in change of the basic process. This has been due primarily to the inherently slow rate of reaction between the bacteria and the organic impurities, expressed as BOD, serving as their food supply; also, when conditions are imposed on the system that result in an increased rate of reaction between food and bacteria, it has been difficult to supply oxygen quickly enough to meet the demand of the bacteria. As a result, the beneficial aerobic bacteria cease to thrive, and in fact tend to die in the midst of a plentitude of food, and improved treatment performance is prevented. This is particularly true for combined industrial and municipal waste where the BOD values are usually considerably higher than for municipal waste alone.

Although it has been proposed that the difficulties encountered when using air to transfer oxygen to the bacteria be overcome by using oxygen-enriched media or in some instances pure oxygen, practical utilization of the oxygen has not been sufficiently effective or economical for large scale treatment of primary waste effluent. In brief, present day conventional plants for treating secondary sewage generally use relatively ineffective, high sewage equipment including sparging or agitation devices for contacting the waste water with oxygen. The limited ability of such equipment to bring oxygen and the sewage effluent into extensive and continuing contact for supporting a high reaction rate, coupled with the high capital and operating costs thereof, have tended to retard the development of urgently needed and improved sewage treatment plants.

The present invention is concerned with an improved, efficient activated sludge treatment system that allows the economic utilization of oxygen for substantially complete reduction of organic impurities in industrial or municipal waste water.

SUMMARY OF THE INVENTION

In accordance with a preferred form of the invention, sewage effluent from a primary treatment plant is treated in a pipeline reactor with essentially pure oxygen and activated sludge for efficiently removing organic impurities and preparing the remaining waste water for comparatively harmless discharge to receiving waters, or for commercial and/or domestic reuse following standard tertiary treatment, such as ozonation, etc. The inventive process includes initially removing dissolved air (containing nitrogen) as required, from the effluent received from the primary treatment plant, adding to the deaerated (or raw) effluent a stream of essentially pure oxygen in measured quantity together with a stream of recycled activated sludge, and pumping the confluence through a long pipeline reactor that is preferably located underground below the frostline. As the confluence passes through the reactor it is turbulently mixed for ensuring intimate and thorough contact between the oxygen, existing aerobic bacteria and the organic impurities on which the bacteria feed in known manner for reducing BOD to a desired minimum. Activated sludge is produced during this reaction. The output of the pipeline reactor is therefore sludge and clear waste water; the former is mostly returned to the reactor and the latter can readily be reclaimed by tertiary treatment if desired, or can be discharged harmlessly into a river or similar receiving waters.

A principal object of the invention therefore is an improved "activated sludge" system for treating secondary sewage wherein the sewage is passed through a long pipeline reactor for progressively reducing BOD as required.

A further object is an improved closed system for secondary sewage treatment using a measured amount of pure oxygen, that is efficient and economical and that is readily applicable to treatment of industrial and/or municipal waste water or secondary sewage.

A further object is an improved system of the character described above, wherein the major components of the plant including the reactor, can readily be located underground for more efficiently utilizing the surface area of the plant and enhancing its appearance, and for utilizing the temperature stabilizing effect of the underground installation for maintaining the reactor at a substantially uniform reaction temperature throughout the year.

A related object of the invention is an improved reactor consisting of comparatively inexpensive pipeline that can be installed in the manner of conventional pipeline within a trench and disposed as desired in a generally linear or reverse-curve pattern according to area considerations.

Other objects, features, and advantages will appear from the following description with reference to the accompanying drawings.

DESCRIPTION OF PREFERRED EMBODIMENT OF THE INVENTION

Figure 1:
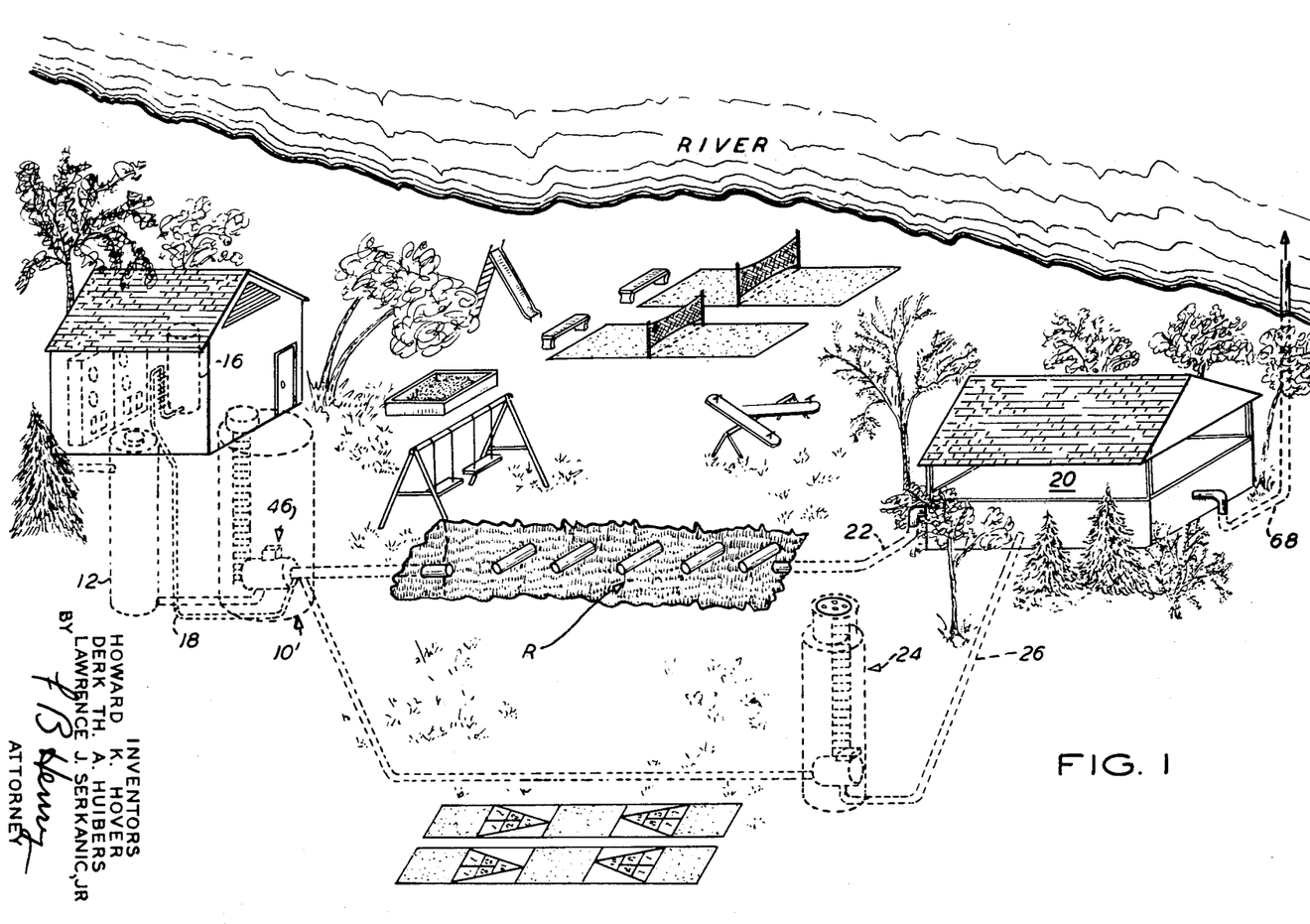
FIG. 1 is a synoptic view of a sewage treatment plant embodying the invention integrated with improved environments.

Referring first to the physical plant layout, FIG. 1 illustrates a preferred form of the invention wherein a major part of the primary effluent treatment equipment, especially that involving reaction between aerobic bacteria and organic impurities, is located below ground. The essential system elements of the plant comprise in general an underground pipeline reactor R, an underground pumping station 10 where incoming primary sewage effluent is pumped from a collection tank 12 into the reactor, a source of pure oxygen such as an aboveground tank 16 of liquid oxygen that is connected by a feed line 18 including vaporizing means, to the input of the pipeline reactor, a clarifier 20 for receiving at 22 the discharge from the reactor and separating clear waste water from the reactor activated sludge, and a pumping station 24 wherein activated sludge is pumped from the clarifier through a return line 26, also to the input of the pipeline reactor; thus, the respective flow streams comprising incoming sewage effluent or waste water, oxygen and activated sludge merge as a confluence at the entrance of the reactor for mixed flow therethrough. Associated equipment of the plant such as pumps, flow rate control valves, etc., constitute in general standard apparatus that can be selected according to plant requirements.

The sewage treatment plant of the invention is especially unique as regards possible layout schemes for integrating it in a noninterfering and inconspicuous manner with civic facilities, such as parks, playgrounds, parking lots, etc. FIG. 1 illustrates by way of example such a possibility, wherein the areas above the underground reactor R and pumping stations 12 and 24 can be advantageously used for recreational facilities or other useful purposes as generally indicated. The aboveground facilities including the oxygen storage tank 16, control equipment, etc., can be housed in buildings or enclosures of acceptable architectural design, such as used for public utility substations in residential areas. Accordingly, the invention readily lends itself to greatly extended and economical use of the plant area.

Figure 2:
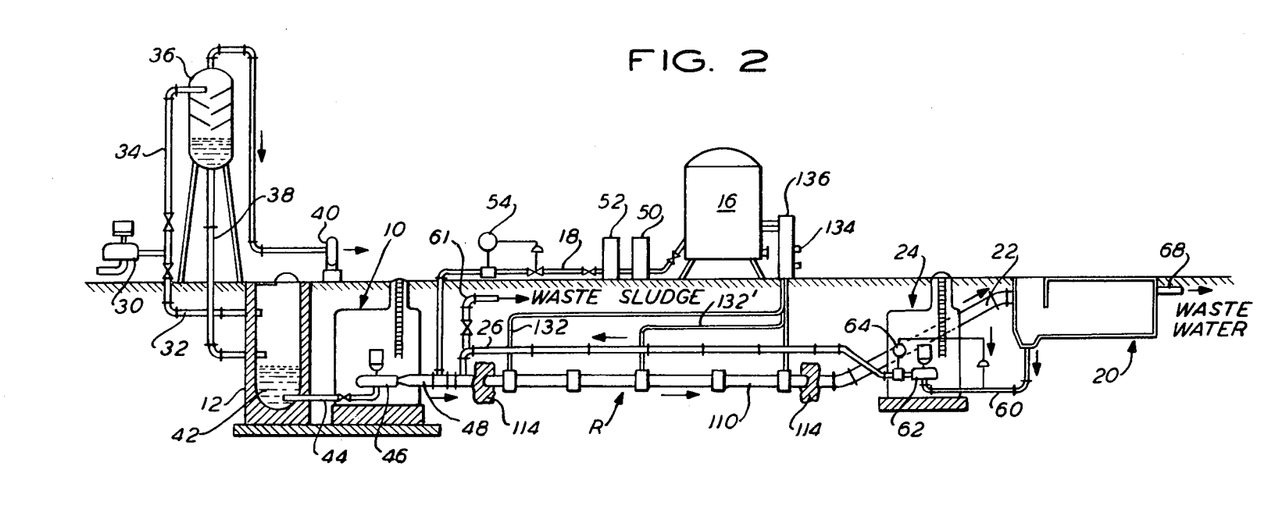
FIG. 2 is a partly schematic view in elevation of a secondary sewage treatment plant embodying the present invention.

In the disclosed system, raw sewage effluent in drawn from settling basins of a primary treatment plant (not shown) that receives sewage or waste water from the municipal and/or industrial drains. The effluent or waste water is pumped by a transfer pump 30 to the collector tank 12, either directly through a bypass line 32, or by a line 34 to a vacuum deaerator 36 from which it flows through a discharge line 38 into the collector tank. The raw effluent in the collector tank contains only semisuspended and suspended solids.

Because of the large nitrogen content of air, and the desirability of limiting the nitrogen content of the effluent in the interest of most efficient reaction, it may be advantageous in some cases to deaerate the effluent before admitting it to the reactor, depending on factors involving the rate of oxygen transfer required, such as the length of the reactor, amount of pure oxygen admitted, etc. The deaerator is of conventional baffle type and is connected to a vacuum pump 40 of the water-sealed type that is not affected by froth from the deaerator, for removing dissolved air from the liquid as it collects in the deaerator dome. Constant flow is normally maintained through the deaerator or bypass 32, as the case may be, such as by conventional flow recording and liquid level controls (not shown).

From the collector tank 12, the deaerated (or raw) effluent 42 flows through the outlet pipe 44 to the pumping station 10 where a centrifugal pump 46 discharges the effluent at a pressure head of about 2 p.s.i.g. into the receiving or input end 48 of the pipeline reactor R. This stream of primary effluent is joined as mentioned above, by a stream of pure oxygen from the oxygen line 18 and a stream of activated sludge from the sludge return line 26. The oxygen supply from the storage tank 16 is suitably vaporized by passing it in succession through a heat exchanger 50 using ambient air as the warming medium, and an electric superheater 52 for heating and expanding the oxygen gas in the supply line 18 for optimum use in the reactor. A conventional flow regulating control is indicated at 54 in the supply line 18 for introducing a measured amount of oxygen into the pipeline reactor according to reaction requirements.

The stream of added activated sludge is also subject to flow rate control for optimum reaction conditions. The sludge that is to be returned to the reactor inlet is collected as it settles to the bottom of the clarifier 20, from which it flows through the discharge line 60 to the pumping station 24 and sludge return pump 62, where it is pumped through the return line 26 and into the reactor pipeline. A conventional flow-regulating control indicated at 64 can be used for establishing the flow rate of sludge return. In practice, about 90 percent of the collected sludge is returned to the reactor, with the remainder discharged through a suitably valved outlet at 61, into a sludge digester (not shown), or the like, as waste.

The clarifier 20 used herein may be a standard commercial design having self-cleaning tube modules for separating the sludge from the clear waste water as made by Neptune Microfloc Corporation. A brief description, referring to FIGS. 5 and 6, will be sufficient for understanding its operation. The clarifier consists of a large tank 66 that receives at one end the reactor pipeline discharge constituting waste water and bacterial sludge from the reactor output at 22. The reactor discharge fills the tank to a level that is slightly above a horizontal baffle 70, FIG. 5, and is regulated by the overflow pipe 68 for discharging the clear waste water. The baffle, through which extend a large number of inclined parallel tubes 72, FIG. 6, is supported horizontally in the tank 66 so as to divide it into upper and lower sections, 74 and 76 respectively; also the baffle is spaced from the intake end wall 78 to form a receiving chamber 80 that is closed by a vertical partition 82 from the tank upper section, and is open to the lower section 76.

Figure 5:
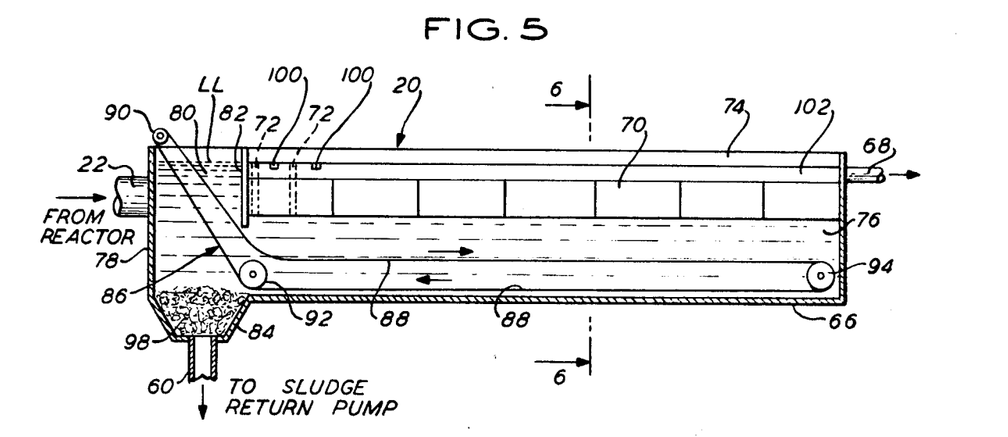
FIG. 5 is an elevation view in longitudinal cross section of a known form of clarifier unit that can be used with the plant system of FIG. 2.
Figure 6:
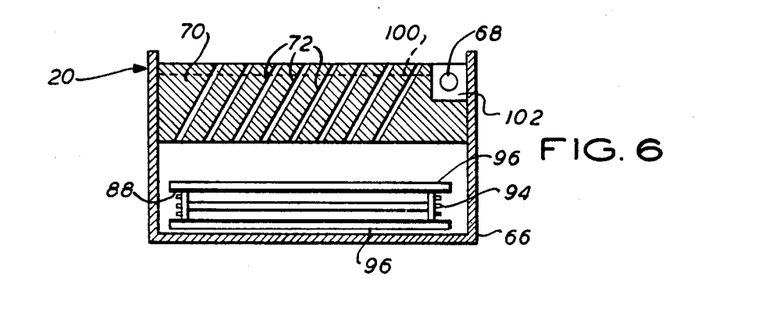
FIG. 6 is a sectional view taken along the line 6—6 of FIG. 5.

As the incoming mixture flows from the receiving chamber 80 into the lower section 76 beneath the baffle, it tends to flow upwards through the tubes to seek its level LL, FIG. 5. Due to the large baffle area involved, the upward flow through the tubes is comparatively slow so that the sludge tends to settle therein and slide back by gravity through the tubes and to settle in the lower section 76. As the sludge settles, it is continuously moved toward a discharge sump 84 by a known type of sludge scraper 86 that comprises an endless belt 88 guided on sprocket-type rollers 92 and 94 and propelled by a drive roller 90. The belt exterior surfaces, i.e. opposite the bottom wall of the tank, are provided with suitable scraping elements 96, FIG. 6, for progressively moving the collected settled sludge toward the intake chamber 80 and into the sump at 89. The sump drains into the intake line 60 of the sludge return pump 62. The clear waste water from the tubes 72 flows over the top of the baffle into transverse launders 100, from which it drains at one side of the clarifier tank into a lateral waste water channel 102 that in turn leads to the overflow pipe 68 for disposal as described above.

Figure 3:
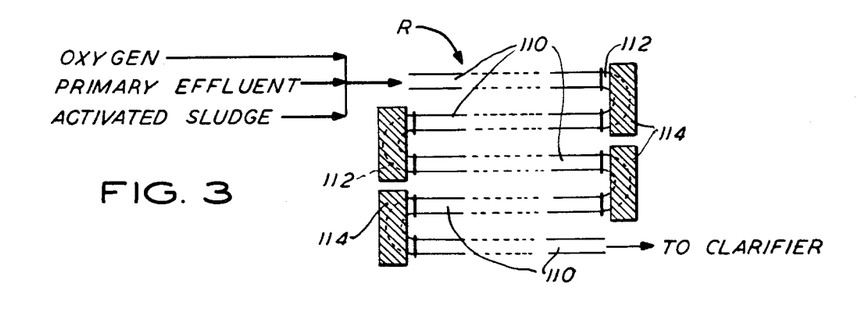
FIG. 3 is a partial plan view of the underground pipeline reactor of FIG. 2 disposed in a reverse-curve pattern.
Figure 4:
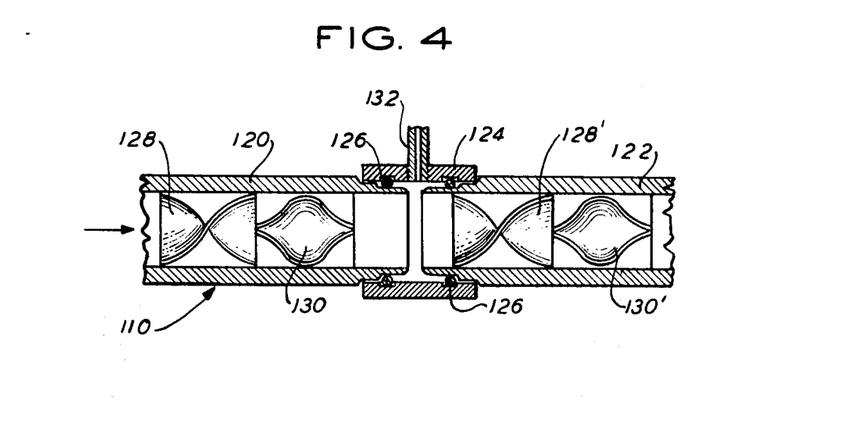
FIG. 4 is an enlarged view in cross section of a portion of the reactor shown in FIGS. 2 and 3, wherein static mixers for producing turbulence are used.

The pipeline reactor R, referring specifically to FIGS. 2 and 4, can be suitably constructed as conventional pipeline, using standard lengths of commercial pipe, such as a composition pipe made of asbestos and concrete known to the trade as "Transite." As high internal pressures are not involved, other inexpensive pipe such as concrete pipe in standard lengths can be used. Where space is available, extension of the pipeline generally along an extended linear or straightaway path is preferred, especially as the pressure drop is minimal and pipe in standard lengths can economically be laid in longitudinal gravel bed trench below the frostline by conventional methods. Where linear extension is incompatible with area boundaries, the pipeline can be arranged in a more compact reverse-curve or loop pattern such as indicated by FIG. 3, for example In this form, a plurality of linear pipeline sections 110 can be grouped in closely spaced parallel trenches and interconnected for continuous passage, the connections conveniently being U-sections 112 of cast iron. For permanently anchoring the respective bends of the pipeline reactor, the U-sections can be set in concrete thrust blocks 114 as shown.

As the multiple linear sections of the reactor layout shown in FIG. 3 can also be made of inexpensive pipe in standard lengths, this pattern is still economical as compared with the usual bulky and complicated open aeration tanks, etc., for treatment of equal amounts of secondary sewage. A further practical consideration is that the activated sludge return-line for the reactor of FIG. 3 can be much shorter than for the extended linear reactor.

In a proposed use of the invention for handling 1.5 million gallons per day of effluent from primary treatment, the pipeline reactor comprises 8,000 feet of "Class 100 Transite" pipe, having an internal diameter of 2 feet. The pattern generally shown in FIG. 3 is used with 16 linear sections, each 500 ft. in length. Although the pipeline reactor would be buried in most installations so as to be below the frostline, it is within the scope of the invention to lay the pipeline aboveground, for example, in warm countries where low temperatures are not encountered, and where economic factors are determining.

A feature of the invention is the possible use of static mixers for producing mixing of the waste water, oxygen and sludge in the pipeline reactor. The number of static mixers to be used in a particular installation is determined by the nature of the flow in the reactor (i.e., turbulent or laminar), the length of the reactor, and the quantity of oxygen, or oxygen-enriched gas introduced into the reactor. It is possible, considering specific pollution content and flow rate of the given waste water, that no special mixers would be required, especially where bends or changes in direction of the pipeline reactor induce sufficient turbulence, or where the velocity of the waste water and the diameter of the pipeline reactor are so interrelated that the Reynolds Number ($> 2,100$) is sufficiently high to produce the required turbulence. A preferred form of static mixer is shown in FIG. 4 illustrating a portion of a reactor section with two adjoining lengths of pipe 120 and 122 united by a suitable coupling sleeve 124 and gasket seals 126. In this case, each length of pipe contains fixed mixer units, such as shown at 128 and 130 in pipe 120, and at 128' and 130' in pipe 122. The units may be disposed in spaced pairs as shown, or continuously joined throughout a pipe length, according to the flow velocity, degree of mixing required, etc.

As shown in FIG. 4 the mixer units are of a type known commercially as "Static Mixer" made by Kenics Corporation for multicomponent in-process mixing. Referring to the pair of joined units 128 and 130, complementary ribbonlike strips are twisted as best shown by unit 128. The direction of twist is reversed in the portion 130, so that reactor flow (as viewed from the left, FIG. 4) is alternately first directed counterclockwise by the mixer unit 128, and then clockwise by the unit 130. This cycle is repeated at each pair of mixer units for imparting a churning motion or turbulence to the waste water tending to mix intimately and continuously all the components of the confluence and also to prevent settling of biological flocs during passage through the reactor. The mixer units can be made of any material that is suitable from the standpoint of cost and durability, such as epoxy fiber glass, polyester, or where abrasion is an important factor, stainless steel for example.

In certain installations it may be advantageous to insert power-driven mixers at spaced positions along the length of the reactor. For example while static mixers may be preferable for comparatively small diameter pipelines, the required turbulence may be more effectively achieved, especially where the flow rate is low as in large diameter pipelines, by power-driven agitators or mixers. The power-driven mixer for this purpose is not limited to any specific type, and can be selected according to power requirements, economic factors, etc. For example, a rotary or fan type mixer could be employed for this purpose.

In practice it is advantageous to locate pressure taps along the reactor, such as at 40 feet intervals, for isolating faults due to blockage, etc., and for monitoring the performance of the reactor. FIGS. 2 and 4 indicate a simple tap arrangement wherein a coupling sleeve 124 is provided with a pressure tap line 132 that is connected, together with a downstream tap 132' as shown in FIG. 2, to standard differential pressure gauge equipment 134 on a control panel 136.

OPERATION OF THE REACTOR

The reactor controls are separately adjusted according to the invention for determining the rate of waste water flow and the respective amounts of added oxygen and activated sludge at the reactor inlet for reducing in predictable manner the BOD in the reactor, and also for utilizing the added oxygen in the most efficient and economical way.

The rate of mass transfer of oxygen from the vapor phase to the waste water and activated sludge is the determining factor in providing an environment where the BOD of the waste water is reduced in the shortest time. This transfer rate is proportional to the oxygen concentration gradient, i.e., the difference between the actual oxygen (dissolved) concentration in the waste water under existing temperature and pressure conditions, and the oxygen concentration at saturation for similar temperature and pressure conditions. The use of oxygen rather than air increases the rate of oxygen transfer to the waste water and activated sludge. For example, at 78° F. and atmospheric pressure the oxygen saturation concentration in the waste water is 39.1 p.p.m. (parts per million) as compared with but 8.2 p.p.m. where air is used under similar conditions. As the activated sludge in the waste water requires about 2.5 p.p.m. oxygen to reduce the BOD of the waste water at the maximum rate, the oxygen concentration at such rate becomes 36.6 p.p.m. with pure oxygen, and 5.7 p.p.m. with air; that is, the rate of mass transfer of oxygen to the waste water and activated sludge is about 6.4 times greater than in the case of air.

As regards the sludge component, the rate of reaction between activated sludge and organic impurities is in general proportional to the product of the concentrations of these two components in the mixed liquor. This reaction rate is also independent of oxygen concentration, provided of course the oxygen concentration meets or exceeds the minimum value, i.e., about 2.5 p.p.m. Accordingly, the rate of reaction can be increased by increasing the amount of activated sludge that is returned to the reactor inlet. However, the poor mass transfer properties of air cannot maintain at 2.5 p.p.m. the bare minimum oxygen concentration needed to support such increased rate of reaction. By providing pure oxygen for ensuring a high mass transfer rate, this barrier is eliminated so that it is now possible according to the invention to use much higher sludge concentration in the reactor for achieving a high rate of reaction and subsequent reduction of detention time.

Thus, the use of pure oxygen at high concentration gradient in the pipeline reactor with the optimum amount of sludge not only provides for more effective operation of a given size plant, but also maximum rate of reaction between the aerobic bacteria (activated sludge) and the organic pollutants for reducing BOD, which can also be expressed as the amount of oxygen required to eliminate pollution in a given amount of sewage.

For example, in a proposed plant using the pipeline reactor for reducing the BOD in 1.5 million gallons per day of waste water from 800 p.p.m. to 25 p.p.m. a 97 percent reduction in BOD is achieved with a 2.3 hour detention time. This short detention time is as mentioned above, a small fraction of that required with air for obtaining an equivalent BOD reduction, and results from the high activated sludge concentration (i.e., 6,000 p.p.m.) introduced at the inlet of the reactor.

The amount of pure oxygen fed to the reactor can be readily calculated for a given, comparatively constant BOD of the entering sewage effluent. Where BOD is subject to material variation, such as during a 24 hour demand period, the flow recording controller at 54, FIG. 2, can be periodically adjusted for optimum oxygen flow by by observation of a conventional oxygen sensor analyzer (not shown) that indicates the oxygen content of samplings taken from the outlet of the pipeline reactor. Although pure oxygen is preferred for the reaction process, a suitable oxygen-bearing medium can be used, provided it meets the total oxygen demand requirement. The total amount of oxygen is more conveniently added at the reactor entrance; however, supplemental oxygen may, if desired, by introduced at intervals along the pipeline.

The efficiency or rate of reaction may in certain instances be improved by initial deaeration of the waste water. Deaeration removes undesirable dissolved gases such as nitrogen, that adversely affect the transfer of oxygen gas to the waste water in the reactor. The need for deaeration depends on the BOD and/or the amount of dissolved undesirable gases in the waste water.

Although in its more general use, the invention is concerned with the treatment of primary effluent, i.e., the waste water that is drawn from the top of the settling basins of the primary treatment plant, it may be possible in certain instances to treat directly the raw waste stream where the content of settleable solids is low.

The long pipeline reactor together with mixers (static or dynamic) function in the manner described above for providing extended reaction contact between the primary effluent and the dissolved oxygen in the waste water. Accordingly, optimum utilization of the oxygen supply is achieved for enabling the biological organisms (aerobic bacteria) in the sludge to perform their function in reducing the BOD of the waste; also the optimum use of the dissolved oxygen tends to stabilize reaction temperature and prevents the formation of anaerobic bacteria and incidental killing of the aerobic bacteria. The growth of anaerobic bacteria not only slows down the reaction rate (due to inherently lower BOD rate) but also results in objectionable odors.

As the pipeline reactor of the invention operates at somewhat above atmospheric pressure, the resulting higher oxygen concentration obtainable, i.e., above the 36.6 p.p.m. value previously mentioned, represents an even greater improvement over the conventional open channel basins with mechanical aeration devices operating at atmospheric pressure. This higher concentration in turn, results in a corresponding greater rate of oxygen transfer and ability to support microbial activity.

Notwithstanding the example data mentioned above, the length of the pipeline for achieving desired BOD reduction will vary according to factors such as rate flow (detention time), preferred temperature of the reacting mixture, nature and amount of pollution in the primary effluent (municipal and/or industrial, etc.) recycled sludge loading, etc. In brief, the reactor design factors together with final BOD reduction be predicted by calculation within close limits, given the BOD requirement of the entering sewage. Maintenance of the pipeline reactor can follow standard pipeline procedures; for example, provision can readily be made for periodic cleaning of the line by draining and reverse-flow purging.

An important advantage of the pipeline reactor, one that also helps to reduce the detention time in the reactor, is that it approaches the ideal contacting scheme for the biological reaction. The biological reaction is autocatalytic; that is solids or bacteria are both a reactant and a product of the reaction. As such, with high solids concentration at the reactor inlet, the theoretically ideal reactor in a "plug flow" type reactor with no back mixing; i.e., mixing of essential components after the waste water is in the reactor. The pipeline reactor, by the nature of its physical dimensions, i.e., very high L/D ratio, approaches the ideal "plug flow" reactor. Conversely, in conventional aeration basins, considerable back mixing of the mixed liquor occurs, and this results in increased detention times for equivalent BOD reductions.

Summarizing generally, the pipeline reactor of the invention lends itself by reason of its reaction efficiency and mechanical simplicity to reduced capital outlay and operating costs of an activated sludge secondary sewage treatment plant.

The pipeline reactor, because of the unique method of contacting oxygen and waste water, utilizes essentially all the oxygen that is introduced into the reactor. None is wasted, because only the amount necessary to reduce the BOD of the waste water, plus the oxygen saturation requirement of the waste water, is introduced. The pipeline reactor is preferably operated entirely filled with a highly turbulent mixture of waste water, activated sludge and oxygen so that contact between oxygen and the sludge and waste water is improved and maintained and so that a vapor phase is avoided. The avoidance of a vapor phase also reduces any explosive hazard. As mentioned above, the contacting of oxygen and waste water is assisted by creating turbulence in the pipeline reactor. This can be done by mechanical mixing (static or driven mixers) or by pumping the waste water so as to create a turbulent flow (Reynolds Number >2,100) in the pipeline reactor or by a combination of these techniques or any other suitable technique.

It is envisioned that the inventive process and apparatus disclosed herein may not only be applied to the treatment of effluent from municipal and industrial sewage but to the treatment of other liquid wastes such as machine cutting oils, paints, glycols, alcohols, and ketones, etc., from industrial or other facilities. The term "waste water" is therefore intended to mean any biologically degradable liquid waste.

The term "oxygen" as used herein means an oxygen-bearing medium such as ozone, oxygen-enriched air, pure oxygen, etc., that can be used for achieving oxygen-saturation of the waste water and desired reduction of BOD in accordance with the invention.

Having set forth the invention in what is considered to be the best embodiment thereof, it will be understood that changes may be made in the system and apparatus as above set forth without departing from the spirit of the invention or exceeding the scope thereof as defined in the following claim.

1. In an activated sludge system for treating waste water, the method which comprises directing at predetermined flow rate a stream of waste water into an elongated closed passage, adding oxygen to the waste water in amount sufficient to reduce the biological oxygen demand of pollutants therein to a desired amount during the detention time of the waste water in the passage, adding to the stream of waste water a stream of activated sludge that is recycled from the passage discharge for providing a high rate of microbial activity within the passage, maintaining said confluence within the passage at a pressure in excess of atmospheric pressure, and inducing turbulence of the confluence within the passage by subjecting said confluence during flow through the passage to alternate helical motion in clockwise and counterclockwise directions about the axis of the passage for producing turbulent flow.

2. A sewage treatment plant for treating municipal and/or industrial sewage comprising an elongated pipeline reactor having a very large length diameter ratio for efficiently reducing organic impurities in a waste stream, said reactor including a plurality of elongated interconnected pipeline sections disposed beneath the surface of the ground in a noninterfering and inconspicuous manner whereby the surface areas above the underground reactor may be advantageously used for recreational, business or other purposes, pumping means to inject a waste stream into said pipeline reactor to create substantially a plug type flow through said reactor and thereby substantially eliminate back mixing, means to introduce activated sludge into said pipeline reactor to thereby enhance the reaction rate in the pipeline and shorten the detention time of the waste stream passing through the reactor, means to introduce sufficient gaseous oxygen into said pipeline reactor to at least saturate the waste stream and to reduce the BOD of the waste stream to the desired extent as it passes through said pipeline reactor, said pipeline reactor being normally closed for substantially its entire length to thereby prevent the escape of undissolved gas from the reactor stream as it is being treated, means to receive the treated waste stream from said reactor, further means to concentrate activated sludge from said treated waste stream, and means to direct at least part of the activated sludge to the said sludge introducing means.

3. A sewage treatment plant as specified in claim 2, wherein the reactor in disposed underground beneath the frostline.

4. A sewage treatment plant as specified in claim 2, wherein the reacting mixture in the pipeline is subjected to pressure in excess of atmospheric pressure during flow therethrough.

5. A sewage treatment plant as specified in claim 2, wherein the deflecting reactor passage includes fixed deflecting means for producing turbulence in the reacting mixture.

6. A sewage treatment plant as specified in claim 5 wherein the deflecting means for producing turbulence in the reactor have guiding surfaces for inducing rotary type flow of the mixture and for abruptly reversing the direction of rotary flow.

7. A sewage treatment plant for waste water comprising an elongated pipeline reactor for efficiently removing organic impurities from a waste water stream, said reactor including a plurality of elongated pipeline sections, means to inject a waste water stream into said pipeline reactor under hyperbaric pressure to fill said reactor and substantially plug-type flow in said reactor and thereby substantially eliminate back missing, means for introducing activated sludge into said pipeline reactor adjacent the inlet thereof to thereby enhance the reaction rate in the pipeline and thereby reduce the detention time of the waste stream passing through the reactor, means to inject sufficient gaseous oxygen into said pipeline reactor adjacent the inlet thereof to at least saturate the waste stream and to progressively reduce the BOD of the composite reactor stream as it passes through said pipeline reactor to the extent desired, said gaseous oxygen, activate sludge and waste water passing through said pipeline reactor in concurrent fashion throughout a substantial length of the reactor, said pipeline reactor having a plurality of spaced mixing means to cause an increase in turbulent mixing of the waste water, activated sludge and oxygen as said components pass through the said reactor, means to receive the treated waste stream from said pipeline reactor and to concentrate the activated sludge therefrom, means to direct at least part of the concentrated activated sludge to the aforementioned sludge injecting means, said pipeline reactor being closed for substantially its entire length to thereby prevent the escape of undissolved gas from the reactor stream as it is being treated.

8. A sewage treatment plant for reducing the BOD of waste effluent comprising an elongated pipeline reactor including a plurality of elongated interconnected pipeline sections constructed to withstand hyperbaric internal pressure, pumping means to inject under hyperbaric pressure a waste effluent stream into said pipeline reactor so as to create substantially plug type flow through said reactor, storage means containing a supply of oxygen, means connected to said storage means for injecting gaseous oxygen into said pipeline reactor at a flow rate in part determined by the BOD of the waste effluent, means for introducing activated sludge into said pipeline reactor to enhance the reaction rate in the pipeline, said pumping means, said oxygen injecting means and said sludge introducing means creating a turbulent mixture of effluent, sludge and oxygen entirely filling said pipeline reactor for substantially its entire length so that intimate contact between said effluent stream, sludge and oxygen is improved and maintained throughout the length of the pipeline reactor, means to receive the treated waste effluent and to return at least a portion of the activated sludge in said treated waste effluent to the sludge-introducing means.

9. A sewage plant as defined in claim 8 in which at least a substantial portion of the pipeline reactor is located underground, whereby surface areas above the reactor may be used for other purposes.

10. A sewage plant as defined in claim 9, said reactor further comprising a plurality of linear pipeline sections, said linear sections disposed in closely spaced parallel trenches and being interconnected for continuous passage.

11. An out-of-sight sewage treatment plant, the major portion of which is located underground to thereby minimize the utilization of surface space, comprising an elongated pipeline reactor having a very large length to diameter ratio, said reactor including a plurality of elongated interconnected pipeline sections disposed beneath the surface of the ground, said reactor having an entrance communicating with a source of waste effluent, means to pump waste effluent from said source into said reactor under pressure, a liquid oxygen station positioned in close proximity to said reactor, means to vaporize said liquid and supply the resulting gas to said pipeline reactor, further means to introduce activated sludge into said reactor, said pumping means, introducing means and supply means filling said reactor for substantially its entire length with a turbulent mixture of waste effluent, activated sludge and oxygen so that contact therebetween is intimate and maintained throughout passage through said reactor and so that a continuous vapor phase is avoided and means to receive the treated effluent from said reactor.

12. A method of treating a biologically degradable liquid waste in an elongated pipeline reactor having a plurality on elongated interconnected pipeline sections comprising pumping the liquid waste stream into said pipeline reactor at above atmospheric pressure to create substantially plug-type flow through at least part of said reactor and thereby substantially eliminate back mixing, introducing activated sludge into said pipeline reactor to enhance the reaction rate in the pipeline and shorten the detention time of the waste stream passing through and reactor, injecting oxygen into said pipeline reactor in amounts dependent at least in part in the BOD of the incoming liquid waste stream, forming a turbulent mixture of liquid waste, activated sludge and oxygen in said pipeline reactor to fill the same throughout substantially its entire length, passing said turbulent mixture through the length of the pipeline reactor to thereby insure intimate and thorough contact between the oxygen, existing aerobic bacteria and the organic impurities on which the bacteria feed to reduce the BOD of the waste stream to a desired value, collecting the treated waste stream from said reactor, concentrating activated sludge from said treated waste stream and returning at least part of said sludge for introduction into said pipeline reactor.

13. The method defined in claim 12 including injecting sufficient oxygen to at least saturate the waste stream.

14. The method defined in claim 12 further comprising storing said oxygen in liquid form in the vicinity of the reactor, vaporizing said liquid as required and directing the vaporized oxygen to the reactor for injection.

15. The method of claim 12 further comprising inducing further turbulence in said reactor intermediate the ends thereof for further increasing the rate of microbial activity in said mixture.

16. The method of claim 12 including deaerating the liquid waste stream before it is pumped into said pipeline reactor.

17. A sewage treatment plant or treating municipal and/or industrial sewage, the major portion of which plant is located underground in a noninterfering and inconspicuous manner thereby conserving surface areas for recreational, business or other purposes comprising, an elongated pipeline reactor having a very large length to diameter ratio and including a plurality of elongated interconnected pipeline sections disposed beneath the surface of the ground in space saving array, the straight line distance between the entrance and exit of the pipeline reactor being considerably less than the overall length of the reactor, pumping means to inject a waste stream under hyperbaric pressure into said pipeline reactor ,to create substantially plug type flow through said reactor, means to inject activated sludge into said pipeline reactor to thereby provide a continuous supply of aerobic bacteria to said pipeline, means to inject oxygen into said pipeline reactor to at least saturate the waste stream, said pumping means and said oxygen and sludge injecting means substantially filling said pipeline reactor so that contact between said waste stream, sludge and oxygen is intimate and maintained throughout passage through said reactor.

18. A sewage treatment plant as defined in claim 17 in which certain of said pipeline sections have a linear configuration and are grouped in closely spaced parallel trenches, said sections being interconnected for continuous passage.

19. A treatment plant for the aerobic biological treatment of a liquid stream comprising a pipeline reactor forming a passage wherein reaction takes place between bacteria and organic components in said stream, said pipeline reactor including a plurality of elongated interconnected pipeline section, means to force a liquid stream having organic components through said sections under hyperbaric pressure to create substantially plug-type flow, means to introduce active bacteria into said reactor, means to inject oxygen into said reactor, said pipeline sections being arranged in economical and space saving array, the straight line distance between the entrance to said pipeline and the exit being less than the overall length of said pipeline reactor, means to receive treated liquid from said pipeline reactor, further means to separate active bacteria from said treated liquid and return said separated bacteria for introduction into said reactor.

20. A treatment plant as defined in claim 19 wherein at least some of said pipeline sections are linear in configuration and are disposed in a closely spaced parallel arrangement interconnected for continuous passage.

21. A treatment plant as defined in claim 19 wherein said pipeline reactor is located underground in a noninterfering and inconspicuous manner whereby the surface area above the reactor may be used for civic, business or other purposes.

UNITED STATES PATENT OFFICE
CERTIFICATE OF CORRECTION

Patent No. 3,607,735                    Dated September 21, 1971

Inventor(s) Howard K. Hover, Derk Th.A. Huibers, Lawrence J. ~~Serkanic,~~ Jr.

It is certified that error appears in the above-identified patent and that said Letters Patent are hereby corrected as shown below:

Column 1, line 9, "Arden" should read --Ardern--.
    line 46, "sewage" should read --cost--.

Column 4, line 29, "89" should read --98--.
    line 37, "FIGS. 2 and 4" should read --FIGS 2 to 4--.

Column 6, line 54, "by" second occurrence should be deleted.
    line 62, "by" should read --be--.

Column 7, line 26, after "rate" insert --of--.
    line 31, the word --can-- should be inserted before "be".
    line 42, "in" should read --is--.

Column 8, line 14, "claim" should read --claims--.
    line 33, after the word "length" insert --to--.
    line 41, after "stantially" delete "a".
    line 58, after "reactor", "in" should read --is--.
    line 63 "deflecting", first occurrence, should be deleted and "passage" should also be deleted.
    line 71, the word "water" should be deleted.
    line 74, after "and" insert --create--.
    line 75, "missing" should read --mixing--.

Column 9, line 9, "activate" should read --activated--.
    line 10, "concurrent" should read "co-current".
    line 24, after "reactor" the following has been deleted and should be added --having a very large length to diameter ratio, said reactor--.
    line 73, "on" should read --of--.

Column 10, line 6, "and" should read --the--.
    line 7, "in" should read --on--.
    line 32, "or" should read --for--.
    line 39, after "in" insert --a--.

Contd....

UNITED STATES PATENT OFFICE
CERTIFICATE OF CORRECTION

PAGE 2

Patent No. 3,607,735        Dated September 21, 1971

Inventor(s) Howard K. Hover, Derk Th. A. Huibers, Lawrence J. Serkanic, Jr.

It is certified that error appears in the above-identified patent and that said Letters Patent are hereby corrected as shown below:

PAGE 2 of Cert. of Correction:

Column 10, line 62, "section" should read --sections--.
    line 67, after "in", insert --an--.

Signed and sealed this 21st day of March 1972.

(SEAL)
Attest:

EDWARD M. FLETCHER, JR.          ROBERT GOTTSCHALK
Attesting Officer                Commissioner of Patents